(12) United States Patent
Frank

(10) Patent No.: US 12,739,008 B2
(45) Date of Patent: Sep. 15, 2026

(54) TRANSPARENT TRANSMIT DIVERSITY WITH BANDWIDTH DEPENDENT DELAY

(71) Applicant: Lenovo (Singapore) Pte. Limited, Singapore (SG)

(72) Inventor: Colin Frank, Park Ridge, IL (US)

(73) Assignee: Lenovo (Singapore) Pte. Limited, Singapore (SG)

( * ) Notice: Subject to any disclaimer, the term of this patent is extended or adjusted under 35 U.S.C. 154(b) by 9 days.

(21) Appl. No.: 18/845,396

(22) PCT Filed: Feb. 28, 2023

(86) PCT No.: PCT/IB2023/051869

§ 371 (c)(1),
(2) Date: Sep. 9, 2024

(87) PCT Pub. No.: WO2023/170517

PCT Pub. Date: Sep. 14, 2023

(65) Prior Publication Data

US 2025/0192854 A1 Jun. 12, 2025

Related U.S. Application Data

(60) Provisional application No. 63/318,623, filed on Mar. 10, 2022.

(51) Int. Cl.
*H04W 72/0453* (2023.01)
*H04B 7/06* (2006.01)
(Continued)

(52) U.S. Cl.
CPC ......... *H04B 7/0671* (2013.01); *H04L 5/0007* (2013.01); *H04W 28/0215* (2013.01)

(58) Field of Classification Search
CPC ............. H04W 52/146; H04W 52/281; H04W 52/325; H04W 52/34; H04W 52/346;
(Continued)

(56) References Cited

U.S. PATENT DOCUMENTS 9,300,376 B2 * 3/2016 Park .................... H04B 7/0669
2012/0063405 A1 * 3/2012 Han .................... H04L 25/0222
370/329
(Continued)

FOREIGN PATENT DOCUMENTS

EP 3609089 A1 2/2020
WO 2021229445 A2 11/2021

OTHER PUBLICATIONS

PCT/IB2023/051869 , "International Search Report and Written Opinion", PCT Application No. PCT/IB2023/051869, May 16, 2023, 10 pages.

*Primary Examiner* — Eva Y Puente
(74) *Attorney, Agent, or Firm* — FIG. 1 Patents

(57) ABSTRACT

Various aspects of the present disclosure relate to a UE that receives a resource allocation for wireless communication associated with using at least two antennas of the UE, and the wireless communication includes a respective signal associated with each respective antenna of the two antennas. The UE can multiplex a set of modulation symbols associated with the two antennas based on a cyclic-prefix orthogonal frequency-domain multiplex operation. The UE can then transmit the respective signal associated with each respective antenna of the two antennas based on the multiplexing, where a delay of a first signal associated with a first antenna relative to a second signal associated with a second antenna is based on the resource allocation for the wireless communication.

20 Claims, 9 Drawing Sheets

(51) Int. Cl.
*H04L 5/00* (2006.01)
*H04W 28/02* (2009.01)

(58) Field of Classification Search
CPC ... H04W 52/367; H04W 52/42; H04W 72/00; H04W 72/21; H04W 28/0215; H04L 5/0053; H04L 5/0048; H04L 5/0023; H04L 5/0057; H04L 5/0035; H04L 1/0026; H04L 5/0078; H04L 5/001; H04B 7/0417; H04B 7/0478; H04B 7/0486; H04B 7/0626; H04B 7/0632; H04B 7/0639; H04B 7/0456; H04B 7/022
See application file for complete search history.

(56) References Cited

U.S. PATENT DOCUMENTS

2015/0373694 A1* 12/2015 You ....................... H04L 5/0051
370/329
2018/0097534 A1* 4/2018 Manolakos ........... H04L 5/0007
2022/0321386 A1* 10/2022 Pick .................... H04L 25/0224

* cited by examiner

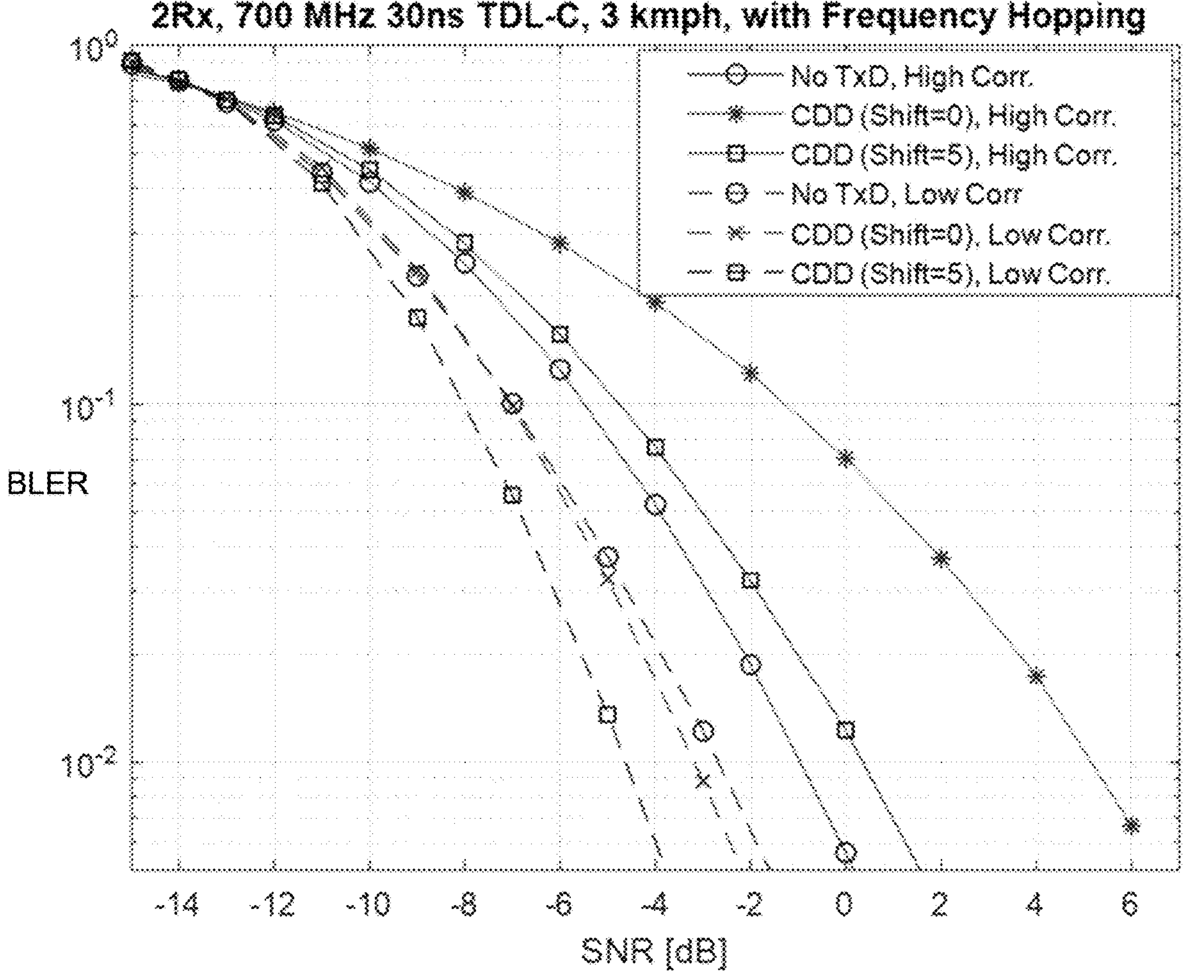
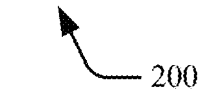
FIG. 2

Transmit a resource allocation for wireless communication associated with a UE that uses at least two antennas, the wireless communication including a respective signal associated with each respective antenna of the two antennas of the UE, the resource allocation including a configuration for transparent transmit diversity of the wireless communication associated with using the two antennas, and the configuration including an indication of a cyclic delay usable by the UE

802

Receive the respective signal associated with each respective antenna of the two antennas of the UE, where a delay of a first signal associated with a first antenna relative to a second signal associated with a second antenna is based on the resource allocation for the wireless communication

804

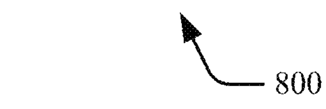

FIG. 8

TRANSPARENT TRANSMIT DIVERSITY WITH BANDWIDTH DEPENDENT DELAY

RELATED APPLICATION

This application claims priority to U.S. Provisional Application Ser. No. 63/318,623 filed Mar. 10, 2022 entitled "Transparent Transmit Diversity with Bandwidth Dependent Delay," the disclosure of which is incorporated by reference herein in its entirety.

TECHNICAL FIELD

The present disclosure relates to wireless communications, and more specifically to transparent transmit diversity with bandwidth dependent delay.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, slots, subslots, mini-slots, aggregated slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G. In some cases, a wireless communications system may be a non-terrestrial network (NTN), which may support various communication devices for wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances.

For third generation partnership project (3GPP) 5G, transparent transmit diversity is an allowed method of transmit diversity for a UE. However, there is no definition of transparent transmit diversity in the specification, and there are no limitations on the implementation of transparent transmit diversity. Further, there is no requirement that delay diversity be used. If delay diversity is used, there is no requirement that it be implemented as cyclic delay diversity or as linear delay diversity, and furthermore there are no requirements or limits on the delay if this is used.

SUMMARY

The present disclosure relates to methods, apparatuses, and systems that support transparent transmit diversity with bandwidth dependent delay. By utilizing the described techniques, a UE having at least two antennas can implement transparent transmit diversity and define a delay to be used for wireless communication, such as cyclic delay diversity or linear delay diversity. A low-delay, cyclic delay diversity can be applied to the signal transmitted from the second antenna of the UE. The symbol from the second antenna is delayed by a time interval less than the symbol duration, after which the portion of the symbol which falls outside of the symbol interval is added to the start of the symbol. Thus, with a cyclic delay, the symbol boundaries are preserved. The effect of this delay is to add a frequency dependent phase rotation of the second signal transmitted from the second antenna relative to the first signal transmitted from the first antenna of the UE.

The UE can identify and use a cyclic delay or linear delay for transmit diversity, which may be a function of the bandwidth of the resource block (RB) allocation. For larger RB allocations (e.g., spanning several MHz of bandwidth), a smaller delay may be used. For smaller RB allocations, such as physical uplink control channel (PUCCH) allocations with only a few RBs, a larger delay may be used. The delay can be selected to ensure that the phase difference between the first and second antennas changes by at least 180 degrees over the bandwidth of the transmission. Alternatively, it may be preferable to ensure that the phase difference between the first and second antennas changes by at least 360 degrees over the bandwidth of the transmission so that there is averaging over frequency of one period of the phase difference. Notably, the PUCCH transmissions contain control information and therefore must be transmitted reliably. Accordingly, transparent transmit diversity can be used to increase transmit power, and can be implemented to accommodate the PUCCH transmissions.

Some implementations of the method and apparatuses described herein may include wireless communication at a device (e.g., a UE), and the UE receives a resource allocation for wireless communication associated with using at least two antennas of the UE, and the wireless communication includes a respective signal associated with each respective antenna of the two antennas. The UE can multiplex a set of modulation symbols associated with the two antennas based on a cyclic-prefix orthogonal frequency-domain multiplex operation. The UE can then transmit the respective signal associated with each respective antenna of the two antennas based on the multiplexing, where a delay of a first signal associated with a first antenna relative to a second signal associated with a second antenna is based on the resource allocation for the wireless communication.

In some implementations of the method and apparatuses described herein, the UE can receive a configuration for transparent transmit diversity of the wireless communication associated with using the two antennas of the UE. The UE can identify the delay of the first signal associated with the first antenna relative to the second signal associated with the second antenna based on the received configuration. The UE can transmit capability signaling indicating a capability of the apparatus to support the transparent transmit diversity for the wireless communication, and the configuration is received based on the transmitted capability signaling. The delay of the first signal associated with the first antenna relative to the second signal associated with the second antenna can be based on a bandwidth of the respective signal associated with each respective antenna.

The UE can also transmit capability signaling indicating a capability of the UE to apply the delay of the first signal associated with the first antenna relative to the second signal associated with the second antenna based on the bandwidth of the respective signal associated with each respective antenna. The bandwidth of the respective signal associated with each respective antenna can be based on a quantity of allocated resource blocks, or based on subcarrier spacing.

The UE can identify the delay of the respective signal associated with each respective antenna as a function of a bandwidth of resource block allocation, or based on a bandwidth of a carrier for the wireless communication. The delay of the first signal associated with the first antenna relative to the second signal associated with the second antenna is a cyclic delay, or is a linear delay, or the first signal associated with the first antenna is delayed without cyclic extension relative to the second signal associated with the second antenna.

Some implementations of the method and apparatuses described herein may include wireless communication at a device, such as a base station (e.g., a gNB), and the gNB transmits a resource allocation for wireless communication associated with a UE that uses at least two antennas, and the wireless communication includes a respective signal associated with each respective antenna of the two antennas of the UE. The resource allocation includes a configuration for transparent transmit diversity of the wireless communication associated with using the two antennas, and the configuration includes an indication of a cyclic delay usable by the UE. The gNB receives the respective signal associated with each respective antenna of the two antennas of the UE, where a delay of a first signal associated with a first antenna relative to a second signal associated with a second antenna is based on the resource allocation for the wireless communication.

In some implementations of the method and apparatuses described herein, the gNB can identify a rule defining the cyclic delay usable by the UE performing the transparent transmit diversity of the wireless communication associated with using the two antennas of the UE. The gNB can receive the respective signal associated with each respective antenna of the two antennas of the UE based on the UE multiplexing a set of modulation symbols associated with the two antennas based on a cyclic-prefix orthogonal frequency-domain multiplex operation. The gNB can receive capability signaling indicating a capability of the UE to support the transparent transmit diversity for the wireless communication, and the configuration is transmitted based on the received capability signaling from the UE. The gNB can configure the cyclic delay usable by the UE based on a bandwidth of resource block allocation. Alternatively, the gNB can configure the cyclic delay usable by the UE based on a bandwidth of a carrier for the wireless communication, or as a finite set of delays. The gNB can configure the finite set of delays as integer multiples of a minimum delay, and transmit the resource allocation with the configuration to the UE, where the configuration includes the finite set of delays and a rule defining applying the finite set of delays.

BRIEF DESCRIPTION OF THE DRAWINGS

Various aspects of the present disclosure for transparent transmit diversity with bandwidth dependent delay are described with reference to the following Figures. The same numbers may be used throughout to reference like features and components shown in the Figures.

FIG. 2 illustrates an example of transmit delivery performance for PUCCH transmissions with frequency hopping as related to transparent transmit diversity with bandwidth dependent delay in accordance with aspects of the present disclosure.

FIGS. 6-9 illustrate flowcharts of methods that support transparent transmit diversity with bandwidth dependent delay in accordance with aspects of the present disclosure.

DETAILED DESCRIPTION

Figure 1:
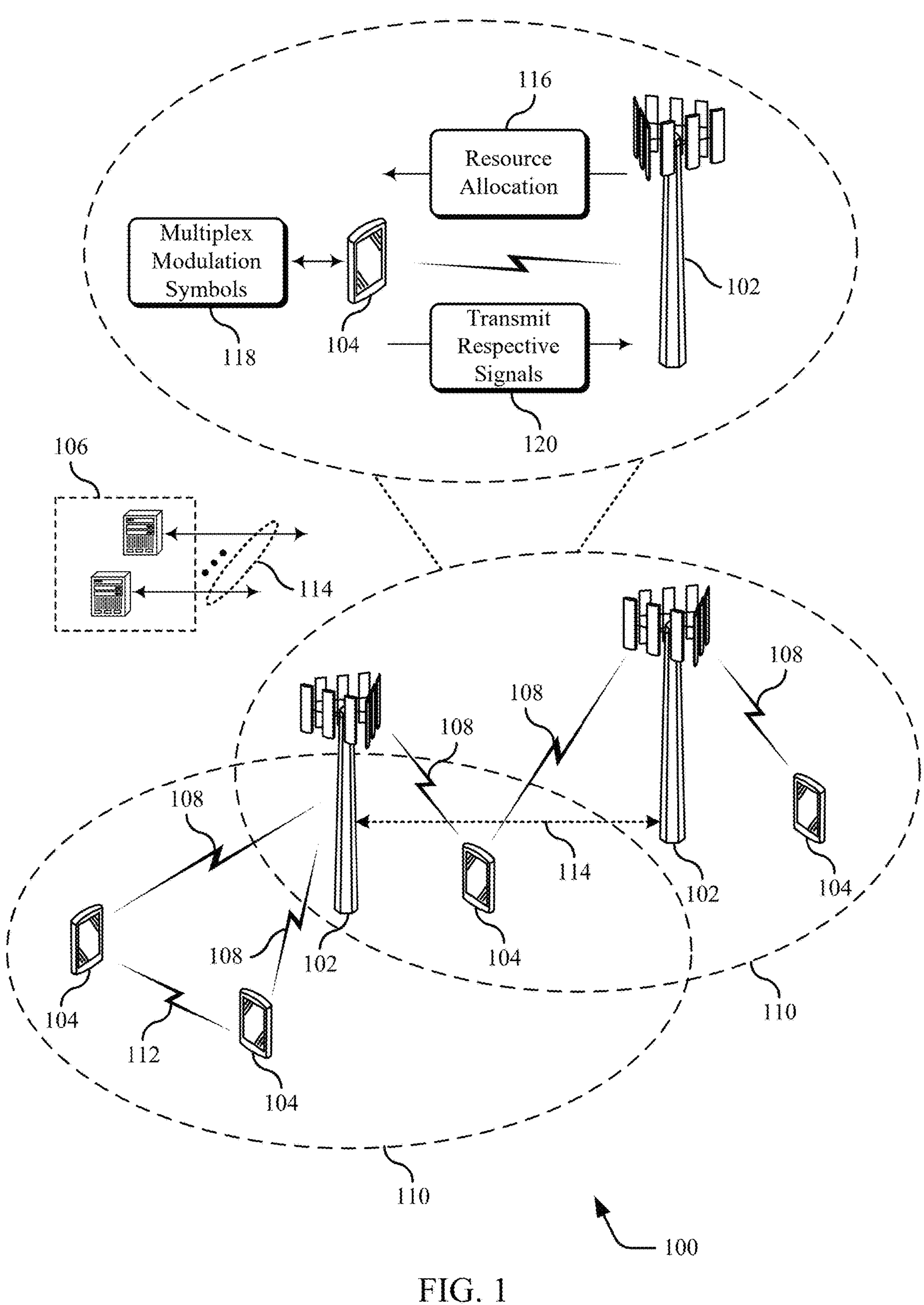
FIG. 1 illustrates an example of a wireless communications system that supports transparent transmit diversity with bandwidth dependent delay in accordance with aspects of the present disclosure.

Implementations of transparent transmit diversity with bandwidth dependent delay are described, such as related to a UE having at least two antennas and implementing transparent transmit diversity. The UE can identify or define a delay to be used for wireless communication, such as cyclic delay diversity or linear delay diversity. A cyclic delay diversity can be applied to the signal transmitted from the second antenna of the UE. The symbol from the second antenna is delayed by a time interval less than the symbol duration, after which the portion of the symbol which falls outside of the symbol interval is added to the start of the symbol. Thus, with a cyclic delay, the symbol boundaries are preserved. The effect of this delay is to add a frequency dependent phase rotation of the second signal transmitted from the second antenna relative to the first signal transmitted from the first antenna of the UE.

There is not a definition of transparent transmit diversity in the 3GPP specification, and there are no limitations on the implementation of transparent transmit diversity. Further, there is no current requirement that delay diversity be used. If delay diversity is used, there is no requirement that it be implemented as cyclic delay diversity or as linear delay diversity, and there are no requirements or limits on the delay if this is used. Accordingly, there is not a limitation as to the implementation of transparent transmit diversity in the 3GPP specification, either in terms of the value of the delay or of the manner, linear or cyclic, in which the delay is implemented in a transmitter. Furthermore, no criteria have been proposed for dynamically optimizing the delay as a function of the bandwidth of the RB allocation. Similarly, cyclic delays may be used, however there is no indication to limit the set of cyclic delays to a finite set of values that are integer multiples of a base value.

Aspects of the disclosure include the UE implemented to identify and use a cyclic delay or linear delay for transmit diversity, which may be a function of the bandwidth of the RB allocation. For larger RB allocations (e.g., spanning several MHz of bandwidth), a smaller delay may be used. For smaller RB allocations, such as PUCCH allocations with only a few RBs, a larger delay may be used. The delay can be selected to ensure that the phase difference between the first and second antennas changes by at least 180 degrees over the bandwidth of the transmission. Alternatively, it may be preferable to ensure that the phase difference between the first and second antennas changes by at least 360 degrees over the bandwidth of the transmission so that there is averaging over frequency of one period of the phase difference. Notably, the PUCCH transmissions contain control information and therefore must be transmitted reliably.

Accordingly, transparent transmit diversity can be used to increase transmit power, and implemented to accommodate the PUCCH transmissions.

In other aspects of the disclosure, a gNB may indicate to the UE the cyclic delay to be used by the UE. Alternatively, the gNB may indicate to the UE a set of cyclic delays which the UE may use. The gNB may also indicate a rule to be used by the UE to select the cyclic delay for a given allocation, where the rule may depend on the number of allocated RBs and the subcarrier spacing. Further, the gNB may also indicate that the cyclic delay should be a function of the carrier bandwidth and not of the allocation bandwidth. Alternatively, the UE may indicate that it can select the cyclic delay based on the number of RBs in the allocation and the subcarrier spacing. The relative phase between the two antennas of the UE can change from in-phase to out-of-phase within one subcarrier. The gNB assumes that the cyclic delay is less than the cyclic prefix when estimating the channel, and therefore some limitation on the cyclic delay facilitates to avoid the channel estimation failing at the gNB. Furthermore, it is beneficial for the gNB to have the value of the cyclic delay, or a range of values for the cyclic delay, as this will enable the gNB to better estimate the channel.

Aspects of the present disclosure are described in the context of a wireless communications system. Aspects of the present disclosure are further illustrated and described with reference to device diagrams and flowcharts that relate to transparent transmit diversity with bandwidth dependent delay.

FIG. 1 illustrates an example of a wireless communications system 100 that supports transparent transmit diversity with bandwidth dependent delay in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be, or include, or may be referred to as a base transceiver station, an access point, a NodeB, an eNodeB (eNB), a next-generation NodeB (gNB), a Radio Head (RH), a relay node, an integrated access and backhaul (IAB) node, or other suitable terminology. A base station 102 and a UE 104 may communicate via a communication link 108, which may be a wireless or wired connection. For example, a base station 102 and a UE 104 may perform wireless communication over a NR-Uu interface.

A base station 102 may provide a geographic coverage area 110 for which the base station 102 may support services (e.g., voice, video, packet data, messaging, broadcast, etc.) for one or more UEs 104 within the geographic coverage area. For example, a base station 102 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite or other non-terrestrial station (NTS) associated with a non-terrestrial network (NTN). In some implementations, different geographic coverage areas 110 associated with the same or different radio access technologies may overlap, and different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 110 of the wireless communications system 100. A UE 104 may include or may be referred to as a mobile device, a wireless device, a remote device, a handheld device, a customer premise equipment (CPE), a subscriber device, or as some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or as a machine-type communication (MTC) device, among other examples. In some implementations, a UE 104 may be stationary in the wireless communications system 100. In other implementations, a UE 104 may be mobile in the wireless communications system 100, such as an earth station in motion (ESIM).

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, a gateway device, an integrated access and backhaul (IAB) node, a location server that implements the location management function (LMF), or other network equipment). Additionally, or alternatively, a UE 104 may support communication with other base stations 102 or UEs 104, which may act as relays in the wireless communications system 100.

A UE 104 may also support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as remote radio heads, smart radio heads, gateways, transmission-reception points (TRPs), and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

According to implementations, one or more of the UEs 104 and base stations 102 (e.g., gNB) are operable to implement various aspects of transparent transmit diversity with bandwidth dependent delay, as described herein. For instance, a base station 102 can communicate a resource allocation 116 for wireless communication associated with a UE 104 that uses multiple antennas (e.g., at least two antennas). The resource allocation 116 can include a configuration for transparent transmit diversity of the wireless communication associated with using the two antennas of the UE, and the configuration can include an indication of a cyclic delay usable by the UE.

The UE 104 receives the resource allocation 116 and can multiplex 118 the modulation symbols associated with the two antennas of the UE based on a cyclic-prefix orthogonal frequency-domain multiplex operation. The UE can also identify the cyclic delay of the respective signal associated with each respective antenna. The UE 104 also transmits respective signals 120 associated with each respective antenna based on the multiplexing, where a delay of a first signal associated with one antenna relative to a second signal associated with the other antenna is based on the resource allocation 116 for the wireless communication. Accordingly, the base station 102 (gNB) receives the transmitted signals 120 from the UE as the wireless communication.

For third generation partnership project (3GPP) 5G, transparent transmit diversity is an allowed method of transmit diversity for a UE. However, there is no definition of transparent transmit diversity in the specification, and there are no limitations on the implementation of transparent transmit diversity. Further, there is no requirement that delay diversity be used. If delay diversity is used, there is no requirement that it be implemented as cyclic delay diversity or as linear delay diversity, and furthermore there are no requirements or limits on the delay if this is used.

Possible transparent transmit diversity methods include cyclic delay diversity (CDD), where the delay is typically less than the cyclic prefix; linear delay that must be small to avoid reducing the ability of the cyclic prefix to contain the channel multipath; and any rank one precoder. Cyclic or linear delay diversity has several advantages relative to single antenna transmissions. For example, cyclic or linear delay diversity can significantly improve link performance on a flat fading channel (frequency independent fading). It enables the UE to transmit more power by using two power amplifiers (PAs), one for each antenna. Thus, the UE can achieve a given power class with X dBm by using two PAs with each having a power of X-3 dBm. In general, it is less expensive to use two PAs having one-half the power of the desired power class. Further, there is no need for additional reference symbols, where the same reference symbols can be transmitted from both antennas in the same time/frequency resource element.

Linear delay has similar advantages to CDD, with the exception that there is a reduction in the ability to tolerate multipath depending on the delay that is used. A rank one precoder allows the UE to transmit more power and can also use the existing reference symbols. However, whether or not a rank one precoder improves link performance depends on the direction in which the resulting beam is pointing. So, in order to be beneficial, a rank one precoder must be randomized in some way (e.g., across frequency or time) or the UE must attempt to select a precoder which points in the direction of the gNB using channel reciprocity.

Typically, it is assumed that low-delay CDD is used for transparent transmit diversity. With this form of diversity, a cyclic delay is applied to the signal transmitted from the second antenna. The symbol from the second antenna is delayed by a time interval less than the symbol duration, after which the portion of the symbol which falls outside of the symbol interval is added to the start of the symbol. Thus, with a cyclic delay, the symbol boundaries are preserved. The effect of this delay is to add a frequency dependent phase rotation of the second signal relative to the first. Depending on the delay applied to the second antenna, the phase rotation can be very small or very large.

As an example, for the case of normal cyclic prefix with a subcarrier spacing of 15 kHz, the first and eight symbols in a slot or subframe (for 15 kHz subcarrier spacing there is one slot per subframe), the symbol duration is 71.9 usec and the cyclic prefix is 5.21 usec. For the remaining symbols, the symbol duration is 71.4 usec and the cyclic prefix is 4.69 usec. Relative to the first antenna, the phase shift (in degrees) from one subcarrier to the next is given by 15000*delay*360. For a delay equal to the cyclic prefix duration of 4.69 μsec, 15000*4.69e-6*360=25.3 degrees and the relative phase between the two antennas changes from in-phase to out-of-phase in approximately seven subcarriers, since 180/25.3=7.1. However, since this is transparent transmit diversity, the UE is not required to limit the cyclic delay to the length of the cyclic prefix. For example, if the cyclic delay is equal to one-half of the symbol duration (excluding cyclic prefix, i.e., 1/(2*subcarrier-spacing)), then the relative phase rotation from one subcarrier to the next is given by 15000*66.7 μsec/2*360=180 degrees.

So, without any limitation on the cyclic delay, the relative phase between the two antennas can change from in-phase to out-of-phase within one subcarrier. Since the gNB assumes that the cyclic delay is less than the cyclic prefix when estimating the channel, it follows there must be some limitation on the cyclic delay, as otherwise the channel estimation at the gNB will fail. Furthermore, even if the delay is limited, it would still be beneficial for the gNB to know the value of the cyclic delay, or a range of values for the cyclic delay, as this will enable the gNB to better estimate the channel.

While it is typically assumed that the cyclic delay will be very small (such as much less than 0.5 microseconds) and much less than the cyclic prefix, the small delay can lead to poor performance for small RB allocations (such as PUCCH allocations) when the channels from the first and second transmit antennas are highly correlated. The reason for this is that with small delay and small bandwidth, the phase rotation of the second antenna relative to the first antenna does not decorrelate across the bandwidth of the allocation. If a delay of 5*Ts is considered, where Ts=32.6 nanoseconds, the phase rotation across two RBs is 15000*5*32.6 nsec*360*23=20 degrees. Thus, if the two signals add out-of-phase and cancel for the first resource element of the two RBs, then the signals will also nearly cancel for the 24th resource element (RE) and all the REs in between.

FIG. 2 illustrates an example 200 of transmit delivery performance for PUCCH transmissions with frequency hopping, as related to transparent transmit diversity with bandwidth dependent delay. As illustrated in this example, the performance of transmit diversity is poor relative to single antenna transmission for delays of 0 and 5*Ts when the channels are highly correlated. However, it can also be observed that performance improves substantially as delay is increased from 0 to 5*Ts. Though not shown, the performance will continue to improve as the cyclic delay is increased up until the point that channel estimation begins to degrade. As it is generally assumed that channel multipath will not exceed the cyclic prefix, it can be expected that channel estimation will begin to degrade as the cyclic delay approaches the length of the cyclic prefix. The PUCCH transmissions are important as they contain control information and therefore must be transmitted reliably. As a result, if transmit diversity is to be used to increase transmit power, it must be implemented in a way that works with PUCCH transmissions and not just with wideband physical uplink shared channel (PUSCH) transmissions.

In aspects of transparent transmit diversity with bandwidth dependent delay, the delay, cyclic or linear, used by a UE for transmit diversity may be a function of the bandwidth of the allocation. For larger RB allocations (e.g., spanning several MHz of bandwidth), a smaller delay may be used. For smaller RB allocations, such as PUCCH allocations with only a few RBs, a larger delay may be used. The delay is selected to ensure that the phase difference between the first and second antennas changes by at least 180 degrees over the bandwidth of the transmission. Alternatively, it may be preferable to ensure that the phase difference between the first and second antennas changes by at least 360 degrees over the bandwidth of the transmission so that there is averaging over frequency of one period of the phase difference.

If there are N physical RBs (PRBs) in an allocation with subcarrier spacing, then the relative phase rotation across the allocation bandwidth is given by (12*N−1)*SCS*delay*360. For an allocation of two RBs and a subcarrier spacing of 15 kHz, the required delay for a relative phase rotation of 180 degrees is:

$$\text{delay} = \frac{180}{23 * 15000 * 360} = 1.45 \text{ microseconds}$$

which is approximately 31% of the cyclic prefix length. The delay required for a relative phase rotation of 360 degrees is given by:

$$\text{delay} = \frac{360}{23 * 15000 * 360} = 2.9 \text{ microseconds}$$

which is approximately 62% of the cyclic prefix. So even for this small allocation, it is possible to set the cyclic delay much less than the cyclic prefix, such that the relative phase rotation across the allocation bandwidth is 360 degrees. Also, it should be noted that the delay that is required scales inversely with the subcarrier spacing. Thus, if the subcarrier spacing is increased from 15 kHz to 30 kHz, the cyclic delay that is needed for a relative phase rotation of 360 degrees across the channel bandwidth decreases from 2.9 microseconds to 1.45 microseconds. So, even though the cyclic prefix length is reduced by one-half when the subcarrier spacing is doubled, the delay needed to achieve a relative phase rotation across the allocation bandwidth is also reduced by one-half so that the cyclic delay is still only 62% of the cyclic prefix.

In an implementation, the cyclic delay for an allocation of N resource blocks may be a function of the number of resource blocks and the subcarrier spacing so long as N is greater than or equal to a minimum value J. If N is less than J, then the cyclic delay for an allocation of N resource blocks may be defined as the cyclic delay for an allocation of J resource blocks. In some implementations, this cyclic delay may be limited to an integer multiple of Ts, where Ts=1/15,000/2048 and the integer multiple may be the ceiling or floor functions of the cyclic delay divided by Ts. In some instances the cyclic delay may be limited to an integer multiple of Tc, where Tc=Ts/32 and the integer multiple may be the ceiling or the floor of the cyclic delay divided Tc.

While it is possible to parameterize channel estimation at the gNB such that it is optimized for any value of the cyclic delay, it may be preferable for the gNB to limit the set of cyclic delays for which the channel estimation algorithm is optimized to a finite set. For a chosen smallest RB allocation of size N and a subcarrier spacing, the largest cyclic delay may be defined as:

$$\text{delay\_max}(N, SCS) = \frac{1}{(12 * N - 1) * SCS}$$

where this is the delay required for a relative phase rotation of 360 degrees across the allocation bandwidth. If the number of allowed delays is to be limited to M, then the delays can be defined as integer multiples of a minimum delay, which is given by:

$$\text{delay\_min}(N, SCS, M) = \frac{\text{delay\_max}(N, SCS)}{M} = \frac{1}{M * (12 * N - 1) * SCS}$$

For an RB allocation of size L, the cyclic delay would be set equal to:

k(L)*delay_min(N,SCS,M)

where $$k(L) = \min\left(\text{ceil}\left(\frac{M * N}{L}\right), M\right)$$

because this is the minimum delay for which the relative phase rotation across the L RBs will equal or exceed 360 degrees.

As an alternative implementation, the gNB may limit the cyclic delay that may be used by the UE to a single value. This single value may correspond to the cyclic delay required for a relative phase rotation of 360 degrees across the allocation bandwidth for an allocation of N resource blocks. In some cases, the number of resource blocks N may be equal to two.

In some implementations, the gNB may indicate to the UE the cyclic delay to be used by the UE. Alternatively, the gNB may indicate to the UE a set of cyclic delays which the UE may use. The gNB may also indicate a rule to be used by the UE to select the cyclic delay for a given allocation, where the rule may depend on the number of allocated RBs and the subcarrier spacing. Finally, the gNB may indicate that the cyclic delay should be a function of the carrier bandwidth and not of the allocation bandwidth.

In some implementations, the UE may indicate to the gNB the set of cyclic delays that it can use for transparent transmit diversity. Additionally, the UE may indicate that it can only apply one of these values for all RB allocations, regardless of the number of RBs in the allocation. Alternatively, the UE may indicate that it can select the cyclic delay based on the number of RBs in the allocation and the subcarrier spacing.

Figure 3:
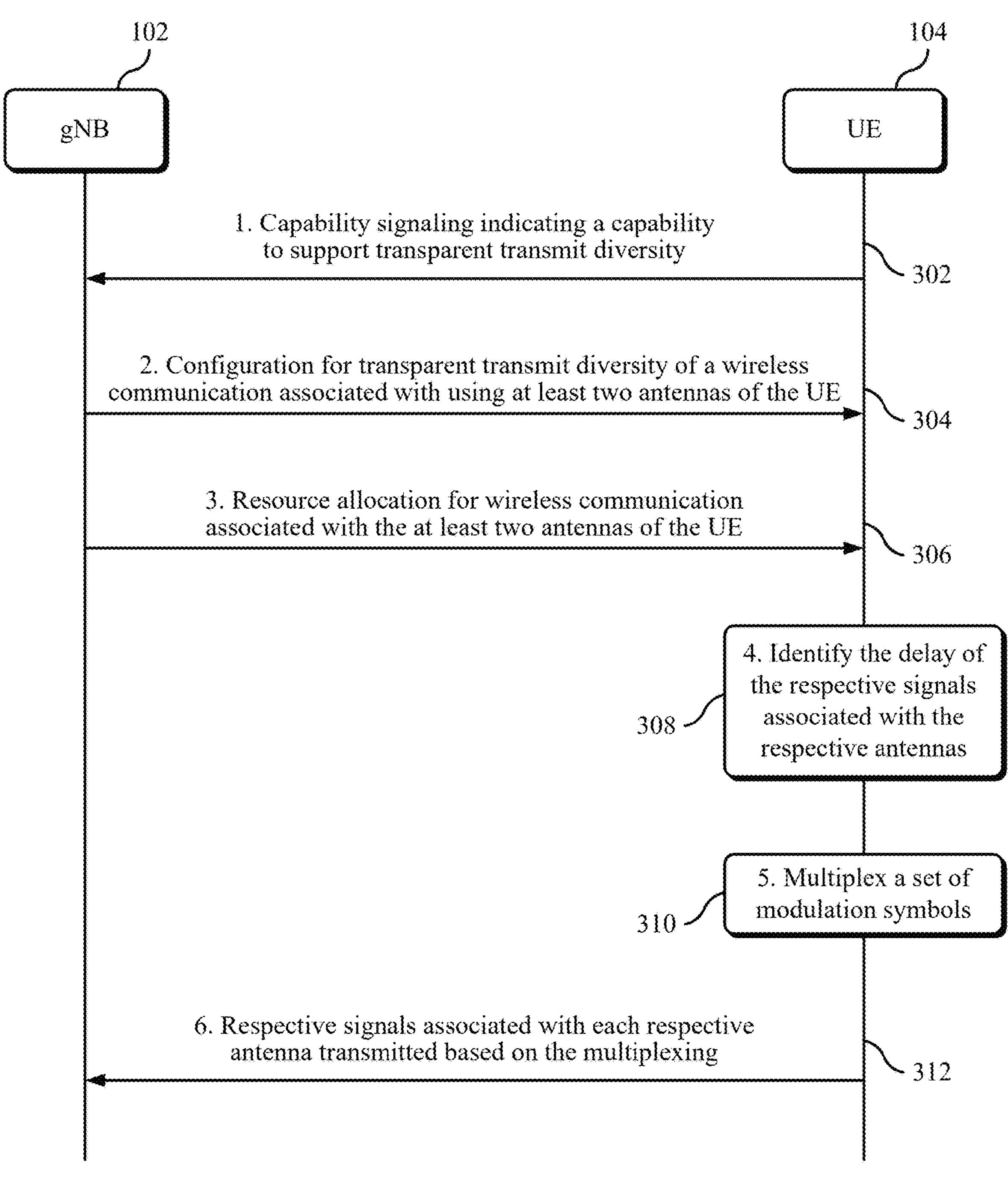
FIG. 3 illustrates an example of message signaling between a gNB and UE that supports transparent transmit diversity with bandwidth dependent delay in accordance with aspects of the present disclosure.

FIG. 3 illustrates and example 300 of message signaling between a gNB and UE that supports transparent transmit diversity with bandwidth dependent delay in accordance with aspects of the present disclosure. In aspects of this disclosure, a UE 104 can transmit capability signaling 302 indicating a capability to support the transparent transmit diversity for wireless communication. The gNB (base station 102) can transmit a configuration 304 for transparent transmit diversity of the wireless communication associated with using at least two antennas of the UE, and the UE receives the configuration 304. The gNB can also transmit a resource allocation 306 for the wireless communication associated with using the at least two antennas of the UE. The wireless communication includes a respective signal associated with each respective antenna of the at least two antennas, and the UE receives the resource allocation 306. The UE can then identify 308 the delay of the respective signals (relative to each other) associated with the respective antennas, which may be based on the received configuration. The UE can also multiplex 310 a set of modulation symbols associated with the two antennas based on a cyclic-prefix orthogonal frequency-domain multiplex operation. The UE can then transmit respective signals 312 associated with each respective antenna based on the multiplexing, and a delay of a first signal associated with a first antenna relative to a second signal associated with a second antenna is based on the resource allocation for the wireless communication.

Figure 4:
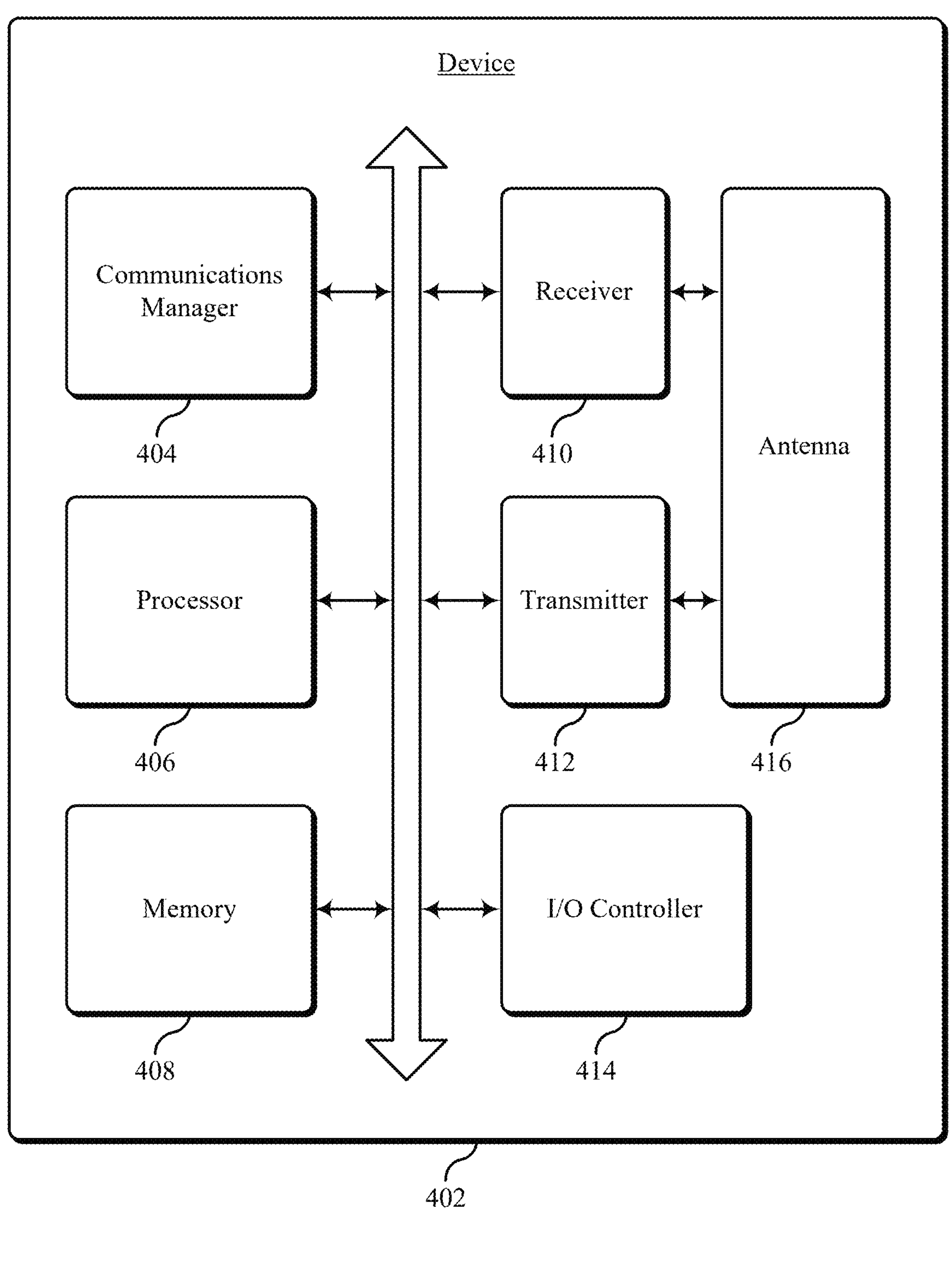
FIG. 4 illustrates an example block diagram of components of a device (e.g., a UE) that supports transparent transmit diversity with bandwidth dependent delay in accordance with aspects of the present disclosure.

FIG. 4 illustrates an example of a block diagram 400 of a device 402 that supports transparent transmit diversity with bandwidth dependent delay in accordance with aspects of the present disclosure. The device 402 may be an example of a UE 104 as described herein. The device 402 may support wireless communication and/or network signaling with one or more base stations 102, other UEs 104, network entities and devices, or any combination thereof. The device 402 may include components for bi-directional communications including components for transmitting and receiving communications, such as a communications manager 404, a processor 406, a memory 408, a receiver 410, a transmitter 412, and an I/O controller 414. These components may be in electronic communication or otherwise coupled (e.g., operatively, communicatively, functionally, electronically, electrically) via one or more interfaces (e.g., buses).

The communications manager 404, the receiver 410, the transmitter 412, or various combinations thereof or various components thereof may be examples of means for performing various aspects of the present disclosure as described herein. For example, the communications manager 404, the receiver 410, the transmitter 412, or various combinations or components thereof may support a method for performing one or more of the functions described herein.

In some implementations, the communications manager 404, the receiver 410, the transmitter 412, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 406 and the memory 408 coupled with the processor 406 may be configured to perform one or more of the functions described herein (e.g., by executing, by the processor 406, instructions stored in the memory 408).

Additionally or alternatively, in some implementations, the communications manager 404, the receiver 410, the transmitter 412, or various combinations or components thereof may be implemented in code (e.g., as communications management software or firmware) executed by the processor 406. If implemented in code executed by the processor 406, the functions of the communications manager 404, the receiver 410, the transmitter 412, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 404 may be configured to perform various operations (e.g., receiving, monitoring, transmitting) using or otherwise in cooperation with the receiver 410, the transmitter 412, or both. For example, the communications manager 404 may receive information from the receiver 410, send information to the transmitter 412, or be integrated in combination with the receiver 410, the transmitter 412, or both to receive information, transmit information, or perform various other operations as described herein. Although the communications manager 404 is illustrated as a separate component, in some implementations, one or more functions described with reference to the communications manager 404 may be supported by or performed by the processor 406, the memory 408, or any combination thereof. For example, the memory 408 may store code, which may include instructions executable by the processor 406 to cause the device 402 to perform various aspects of the present disclosure as described herein, or the processor 406 and the memory 408 may be otherwise configured to perform or support such operations.

For example, the communications manager 404 may support wireless communication and/or network signaling at a device (e.g., the device 402, a UE) in accordance with examples as disclosed herein. The communications manager 404 and/or other device components may be configured as or otherwise support an apparatus, such as a UE, including a transceiver; a processor coupled to the transceiver, the processor and the transceiver configured to cause the apparatus to: receive a resource allocation for wireless communication associated with using at least two antennas, the wireless communication comprising a respective signal associated with each respective antenna of the at least two antennas; multiplex a set of modulation symbols associated with the at least two antennas based at least in part on a cyclic-prefix orthogonal frequency-domain multiplex operation; and transmit the respective signal associated with each respective antenna of the at least two antennas based at least in part on the multiplexing, wherein a delay of a first signal associated with a first antenna of the at least two antennas relative to a second signal associated with a second antenna of the at least two antennas is based at least in part on the resource allocation for the wireless communication.

Additionally, the apparatus (e.g., a UE) includes any one or combination of: the processor and the transceiver are configured to receive a configuration for transparent transmit diversity of the wireless communication associated with using the at least two antennas. The processor and the transceiver are configured to cause the apparatus to identify the delay of the first signal associated with the first antenna of the at least two antennas relative to the second signal associated with the second antenna of the at least two antennas based at least in part on the received configuration. The processor and the transceiver are configured to cause the apparatus to transmit capability signaling indicating a capability of the apparatus to support the transparent transmit diversity for the wireless communication, and wherein the configuration is received based at least in part on the transmitted capability signaling. The delay of the first signal associated with the first antenna relative to the second signal associated with the second antenna is based at least in part on a bandwidth of the respective signal associated with each respective antenna. The processor and the transceiver are configured to cause the apparatus to transmit capability signaling indicating a capability of the apparatus to apply the delay of the first signal associated with the first antenna relative to the second signal associated with the second antenna that is based at least in part on the bandwidth of the respective signal associated with each respective antenna. The bandwidth of the respective signal associated with each respective antenna is based at least in part on a quantity of allocated resource blocks. The bandwidth of the respective signal associated with each respective antenna is based at least in part on subcarrier spacing. The processor and the transceiver are configured to cause the apparatus to identify the delay of the respective signal associated with each respective antenna as a function of a bandwidth of resource block allocation. The processor and the transceiver are configured to cause the apparatus to identify the delay of the respective signal associated with each respective antenna based at least in part on a bandwidth of a carrier for the wireless communication. The delay of the first signal associated with the first antenna relative to the second signal associated with the second antenna is a cyclic delay. The delay of the first signal associated with the first antenna relative to the second signal associated with the second antenna is a linear delay. The first signal associated with the first antenna is delayed without cyclic extension relative to the second signal associated with the second antenna. The delay of the first signal associated with the first antenna relative to the second signal associated with the second antenna is identified based on a calculation comprising one divided by a product of subcarrier spacing and a value derived as a number of allocated resource blocks multiplied times twelve minus one. For a resource block allocation of size L, the delay of the first signal associated with the first antenna relative to the second signal associated with the second antenna is identified based on a calculation of a product comprising: k(L)*delay_min(N,subcarrier spacing, M), wherein L is a size of resource block allocation, N is a number of resource blocks used to set a maximum delay, M is a quantity of delays, and $$k(L) = \min\left(\text{ceil}\left(\frac{M*N}{L}\right), M\right).$$

The communications manager 404 and/or other device components may be configured as or otherwise support a means for wireless communication and/or network signaling at a UE, including receiving a resource allocation for wireless communication associated with using at least two antennas, the wireless communication comprising a respective signal associated with each respective antenna of the at least two antennas; multiplexing a set of modulation symbols associated with the at least two antennas based at least in part on a cyclic-prefix orthogonal frequency-domain multiplex operation; and transmitting the respective signal associated with each respective antenna of the at least two antennas based at least in part on the multiplexing, wherein a delay of a first signal associated with a first antenna of the at least two antennas relative to a second signal associated with a second antenna of the at least two antennas is based at least in part on the resource allocation for the wireless communication.

Additionally, wireless communication and/or network signaling at the UE includes any one or combination of: receiving a configuration for transparent transmit diversity of the wireless communication associated with using the at least two antennas. The method further comprising identifying the delay of the first signal associated with the first antenna of the at least two antennas relative to the second signal associated with the second antenna of the at least two antennas based at least in part on the received configuration. The method further comprising transmitting capability signaling indicating a capability of the apparatus to support the transparent transmit diversity for the wireless communication, and wherein receiving the configuration is based at least in part on the transmitted capability signaling. The delay of the first signal associated with the first antenna relative to the second signal associated with the second antenna is based at least in part on a bandwidth of the respective signal associated with each respective antenna. The method further comprising transmitting capability signaling indicating a capability of the apparatus to apply the delay of the first signal associated with the first antenna relative to the second signal associated with the second antenna that is based at least in part on the bandwidth of the respective signal associated with each respective antenna. The bandwidth of the respective signal associated with each respective antenna is based at least in part on a quantity of allocated resource blocks. The bandwidth of the respective signal associated with each respective antenna is based at least in part on subcarrier spacing. The method further comprising identifying the delay of the respective signal associated with each respective antenna as a function of a bandwidth of resource block allocation. The method further comprising identifying the delay of the respective signal associated with each respective antenna based at least in part on a bandwidth of a carrier for the wireless communication.

The delay of the first signal associated with the first antenna relative to the second signal associated with the second antenna is a cyclic delay. The delay of the first signal associated with the first antenna relative to the second signal associated with the second antenna is a linear delay. The first signal associated with the first antenna is delayed without cyclic extension relative to the second signal associated with the second antenna. The delay of the first signal associated with the first antenna relative to the second signal associated with the second antenna is identified based on a calculation comprising one divided by a product of subcarrier spacing and a value derived as a number of allocated resource blocks multiplied times twelve minus one. For a resource block allocation of size L, the delay of the first signal associated with the first antenna relative to the second signal associated with the second antenna is identified based on a calculation of a product comprising: k(L)*delay_min(N,subcarrier spacing,M), wherein L is a size of resource block allocation, N is a number of resource blocks used to set a maximum delay, M is a quantity of delays, and $$k(L) = \min\left(\text{ceil}\left(\frac{M*N}{L}\right), M\right).$$

The processor 406 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 406 may be configured to operate a memory array using a memory controller. In some other implementations, a memory controller may be integrated into the processor 406. The processor 406 may be configured to execute computer-readable instructions stored in a memory (e.g., the memory 408) to cause the device 402 to perform various functions of the present disclosure.

The memory 408 may include random access memory (RAM) and read-only memory (ROM). The memory 408 may store computer-readable, computer-executable code including instructions that, when executed by the processor 406 cause the device 402 to perform various functions described herein. The code may be stored in a non-transitory computer-readable medium such as system memory or another type of memory. In some implementations, the code may not be directly executable by the processor 406 but may cause a computer (e.g., when compiled and executed) to perform functions described herein. In some implementations, the memory 408 may include, among other things, a basic I/O system (BIOS) which may control basic hardware or software operation such as the interaction with peripheral components or devices.

The I/O controller 414 may manage input and output signals for the device 402. The I/O controller 414 may also manage peripherals not integrated into the device 402. In some implementations, the I/O controller 414 may represent a physical connection or port to an external peripheral. In some implementations, the I/O controller 414 may utilize an operating system such as iOS®, ANDROID®, MS-DOS®, MS-WINDOWS®, OS/2®, UNIX®, LINUX®, or another known operating system. In some implementations, the I/O controller 414 may be implemented as part of a processor, such as the processor 406. In some implementations, a user may interact with the device 402 via the I/O controller 414 or via hardware components controlled by the I/O controller 414.

In some implementations, the device 402 may include a single antenna 416. However, in some other implementations, the device 402 may have more than one antenna 416, which may be capable of concurrently transmitting or receiving multiple wireless transmissions. The receiver 410 and the transmitter 412 may communicate bi-directionally, via the one or more antennas 416, wired, or wireless links as described herein. For example, the receiver 410 and the transmitter 412 may represent a wireless transceiver and may communicate bi-directionally with another wireless transceiver. The transceiver may also include a modem to modulate the packets, to provide the modulated packets to one or more antennas 416 for transmission, and to demodulate packets received from the one or more antennas 416.

Figure 5:
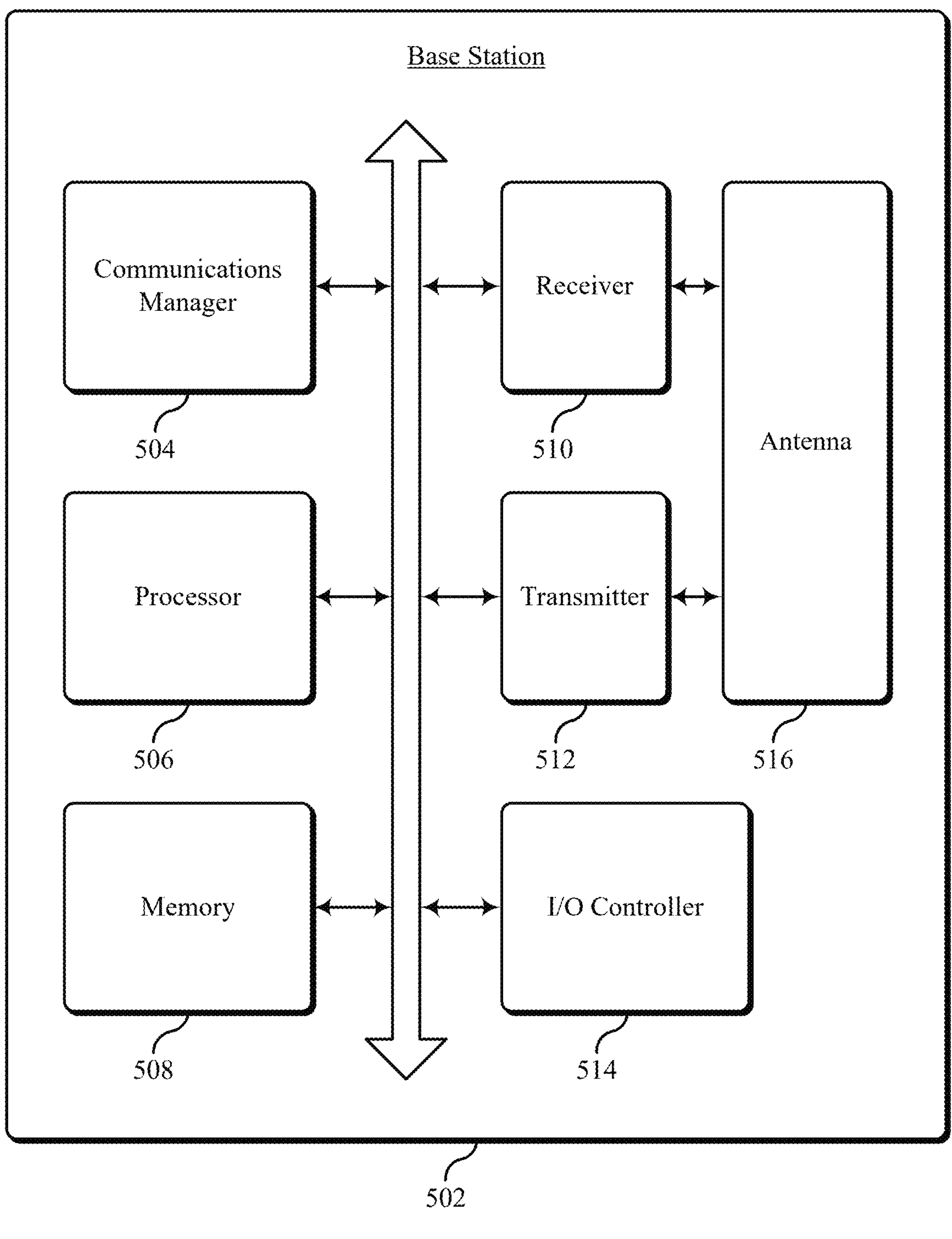
FIG. 5 illustrates an example block diagram of components of a device (e.g., a base station, gNB) that supports transparent transmit diversity with bandwidth dependent delay in accordance with aspects of the present disclosure.

FIG. 5 illustrates an example of a block diagram 500 of a device 502 that supports transparent transmit diversity with bandwidth dependent delay in accordance with aspects of the present disclosure. The device 502 may be an example of a base station 102, such as a gNB, as described herein. The device 502 may support wireless communication and/or network signaling with one or more base stations 102, other UEs 104, core network devices and functions (e.g., core network 106), or any combination thereof. The device 502 may include components for bi-directional communications including components for transmitting and receiving communications, such as a communications manager 504, a processor 506, a memory 508, a receiver 510, a transmitter 512, and an I/O controller 514. These components may be in electronic communication or otherwise coupled (e.g., operatively, communicatively, functionally, electronically, electrically) via one or more interfaces (e.g., buses).

The communications manager 504, the receiver 510, the transmitter 512, or various combinations thereof or various components thereof may be examples of means for performing various aspects of the present disclosure as described herein. For example, the communications manager 504, the receiver 510, the transmitter 512, or various combinations or components thereof may support a method for performing one or more of the functions described herein.

In some implementations, the communications manager 504, the receiver 510, the transmitter 512, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 506 and the memory 508 coupled with the processor 506 may be configured to perform one or more of the functions described herein (e.g., by executing, by the processor 506, instructions stored in the memory 508).

Additionally or alternatively, in some implementations, the communications manager 504, the receiver 510, the transmitter 512, or various combinations or components thereof may be implemented in code (e.g., as communications management software or firmware) executed by the processor 506. If implemented in code executed by the processor 506, the functions of the communications manager 504, the receiver 510, the transmitter 512, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 504 may be configured to perform various operations (e.g., receiving, monitoring, transmitting) using or otherwise in cooperation with the receiver 510, the transmitter 512, or both. For example, the communications manager 504 may receive information from the receiver 510, send information to the transmitter 512, or be integrated in combination with the receiver 510, the transmitter 512, or both to receive information, transmit information, or perform various other operations as described herein. Although the communications manager 504 is illustrated as a separate component, in some implementations, one or more functions described with reference to the communications manager 504 may be supported by or performed by the processor 506, the memory 508, or any combination thereof. For example, the memory 508 may store code, which may include instructions executable by the processor 506 to cause the device 502 to perform various aspects of the present disclosure as described herein, or the processor 506 and the memory 508 may be otherwise configured to perform or support such operations.

For example, the communications manager 504 may support wireless communication and/or network signaling at a device (e.g., the device 502, a gNB) in accordance with examples as disclosed herein. The communications manager 504 and/or other device components may be configured as or otherwise support an apparatus, such as a gNB, including a transceiver; a processor coupled to the transceiver, the processor and the transceiver configured to cause the apparatus to: transmit a resource allocation for wireless communication associated with a user equipment (UE) that uses at least two antennas, the wireless communication comprising a respective signal associated with each respective antenna of the at least two antennas of the UE, the resource allocation comprising a configuration for transparent transmit diversity of the wireless communication associated with using the at least two antennas, the configuration comprising an indication of a cyclic delay usable by the UE; and receive the respective signal associated with each respective antenna of the at least two antennas of the UE, wherein a delay of a first signal associated with a first antenna of the at least two antennas relative to a second signal associated with a second antenna of the at least two antennas is based at least in part on the resource allocation for the wireless communication.

Additionally, the apparatus (e.g., a gNB) includes any one or combination of: the processor is configured to cause the apparatus to identify a rule defining the cyclic delay usable by the UE performing the transparent transmit diversity of the wireless communication associated with using the at least two antennas of the UE. The processor and the transceiver are configured to cause the apparatus to receive the respective signal associated with each respective antenna of the at least two antennas of the UE based at least in part on the UE multiplexing a set of modulation symbols associated with the at least two antennas based at least in part on a cyclic-prefix orthogonal frequency-domain multiplex operation. The processor and the transceiver are configured to cause the apparatus to receive capability signaling indicating a capability of the UE to support the transparent transmit diversity for the wireless communication, and wherein the configuration is transmitted based at least in part on the received capability signaling from the UE. The processor is configured to cause the apparatus to configure the cyclic delay usable by the UE based at least in part on a bandwidth of resource block allocation. The processor is configured to cause the apparatus to configure the cyclic delay usable by the UE based at least in part on a bandwidth of a carrier for the wireless communication. The processor is configured to cause the apparatus to configure the cyclic delay usable by the UE as a finite set of delays. The processor is configured to cause the apparatus to configure the finite set of delays as integer multiples of a minimum delay. The processor and the transceiver are configured to cause the apparatus to transmit the resource allocation comprising the configuration to the UE, the configuration comprising the finite set of delays and a rule defining applying the finite set of delays.

The communications manager 504 and/or other device components may be configured as or otherwise support a means for wireless communication and/or network signaling at a gNB, including transmitting a resource allocation for wireless communication associated with a user equipment (UE) that uses at least two antennas, the wireless communication comprising a respective signal associated with each respective antenna of the at least two antennas of the UE, the resource allocation comprising a configuration for transparent transmit diversity of the wireless communication associated with using the at least two antennas, the configuration comprising an indication of a cyclic delay usable by the UE; and receiving the respective signal associated with each respective antenna of the at least two antennas of the UE, wherein a delay of a first signal associated with a first antenna of the at least two antennas relative to a second signal associated with a second antenna of the at least two antennas is based at least in part on the resource allocation for the wireless communication.

Additionally, wireless communication at the gNB includes any one or combination of: identifying a rule defining the cyclic delay usable by the UE performing the transparent transmit diversity of the wireless communication associated with using the at least two antennas of the UE. The method further comprising receiving the respective signal associated with each respective antenna of the at least two antennas of the UE based at least in part on the UE multiplexing a set of modulation symbols associated with the at least two antennas based at least in part on a cyclic-prefix orthogonal frequency-domain multiplex operation. The method further comprising receiving capability signaling indicating a capability of the UE to support the transparent transmit diversity for the wireless communication, and wherein the configuration is transmitted based at least in part on the received capability signaling from the UE. The method further comprising configuring the cyclic delay usable by the UE based at least in part on a bandwidth of resource block allocation. The method further comprising configuring the cyclic delay usable by the UE based at least in part on a bandwidth of a carrier for the wireless communication. The method further comprising configuring the cyclic delay usable by the UE as a finite set of delays. The method further comprising configuring the finite set of delays as integer multiples of a minimum delay. The method further comprising transmitting the resource allocation comprising the configuration to the UE, the configuration comprising the finite set of delays and a rule defining applying the finite set of delays.

The processor 506 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some implementations, the processor 506 may be configured to operate a memory array using a memory controller. In some other implementations, a memory controller may be integrated into the processor 506. The processor 506 may be configured to execute computer-readable instructions stored in a memory (e.g., the memory 508) to cause the device 502 to perform various functions of the present disclosure.

The memory 508 may include random access memory (RAM) and read-only memory (ROM). The memory 508 may store computer-readable, computer-executable code including instructions that, when executed by the processor 506 cause the device 502 to perform various functions described herein. The code may be stored in a non-transitory computer-readable medium such as system memory or another type of memory. In some implementations, the code may not be directly executable by the processor 506 but may cause a computer (e.g., when compiled and executed) to perform functions described herein. In some implementations, the memory 508 may include, among other things, a basic I/O system (BIOS) which may control basic hardware or software operation such as the interaction with peripheral components or devices.

The I/O controller 514 may manage input and output signals for the device 502. The I/O controller 514 may also manage peripherals not integrated into the device 502. In some implementations, the I/O controller 514 may represent a physical connection or port to an external peripheral. In some implementations, the I/O controller 514 may utilize an operating system such as iOS®, ANDROID®, MS-DOS®, MS-WINDOWS®, OS/2®, UNIX®, LINUX®, or another known operating system. In some implementations, the I/O controller 514 may be implemented as part of a processor, such as the processor 506. In some implementations, a user may interact with the device 502 via the I/O controller 514 or via hardware components controlled by the I/O controller 514.

In some implementations, the device 502 may include a single antenna 516. However, in some other implementations, the device 502 may have more than one antenna 516, which may be capable of concurrently transmitting or receiving multiple wireless transmissions. The receiver 510 and the transmitter 512 may communicate bi-directionally, via the one or more antennas 516, wired, or wireless links as described herein. For example, the receiver 510 and the transmitter 512 may represent a wireless transceiver and may communicate bi-directionally with another wireless transceiver. The transceiver may also include a modem to modulate the packets, to provide the modulated packets to one or more antennas 516 for transmission, and to demodulate packets received from the one or more antennas 516.

Figure 6:
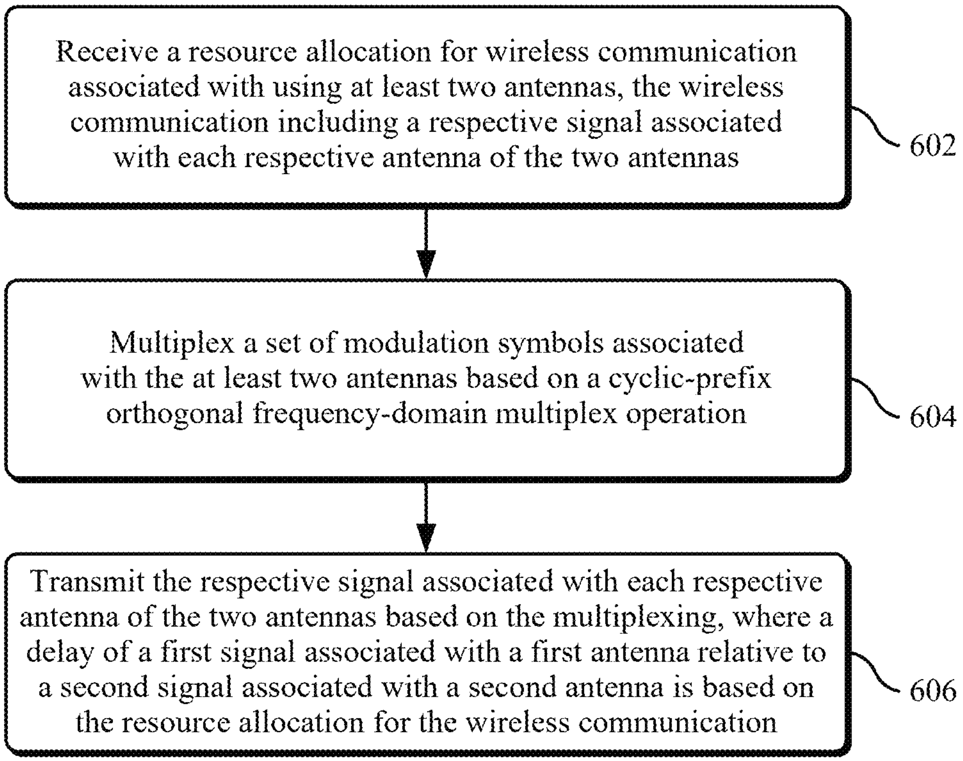

FIG. 6 illustrates a flowchart of a method 600 that supports transparent transmit diversity with bandwidth dependent delay in accordance with aspects of the present disclosure. The operations of the method 600 may be implemented and performed by a device or its components, such as a UE 104 as described with reference to FIGS. 1 through 5. In some implementations, the device may execute a set of instructions to control the function elements of the device to perform the described functions. Additionally, or alternatively, the device may perform aspects of the described functions using special-purpose hardware.

At 602, the method may include receiving a resource allocation for wireless communication associated with using at least two antennas, the wireless communication including a respective signal associated with each respective antenna of the two antennas. The operations of 602 may be performed in accordance with examples as described herein. In some implementations, aspects of the operations of 602 may be performed by a device as described with reference to FIG. 1.

At 604, the method may include multiplexing a set of modulation symbols associated with the at least two antennas based on a cyclic-prefix orthogonal frequency-domain multiplex operation. The operations of 604 may be performed in accordance with examples as described herein. In some implementations, aspects of the operations of 604 may be performed by a device as described with reference to FIG. 1.

At 606, the method may include transmitting the respective signal associated with each respective antenna of the two antennas based on the multiplexing, where a delay of a first signal associated with a first antenna relative to a second signal associated with a second antenna is based on the resource allocation for the wireless communication. The operations of 606 may be performed in accordance with examples as described herein. In some implementations, aspects of the operations of 606 may be performed by a device as described with reference to FIG. 1.

Figure 7:
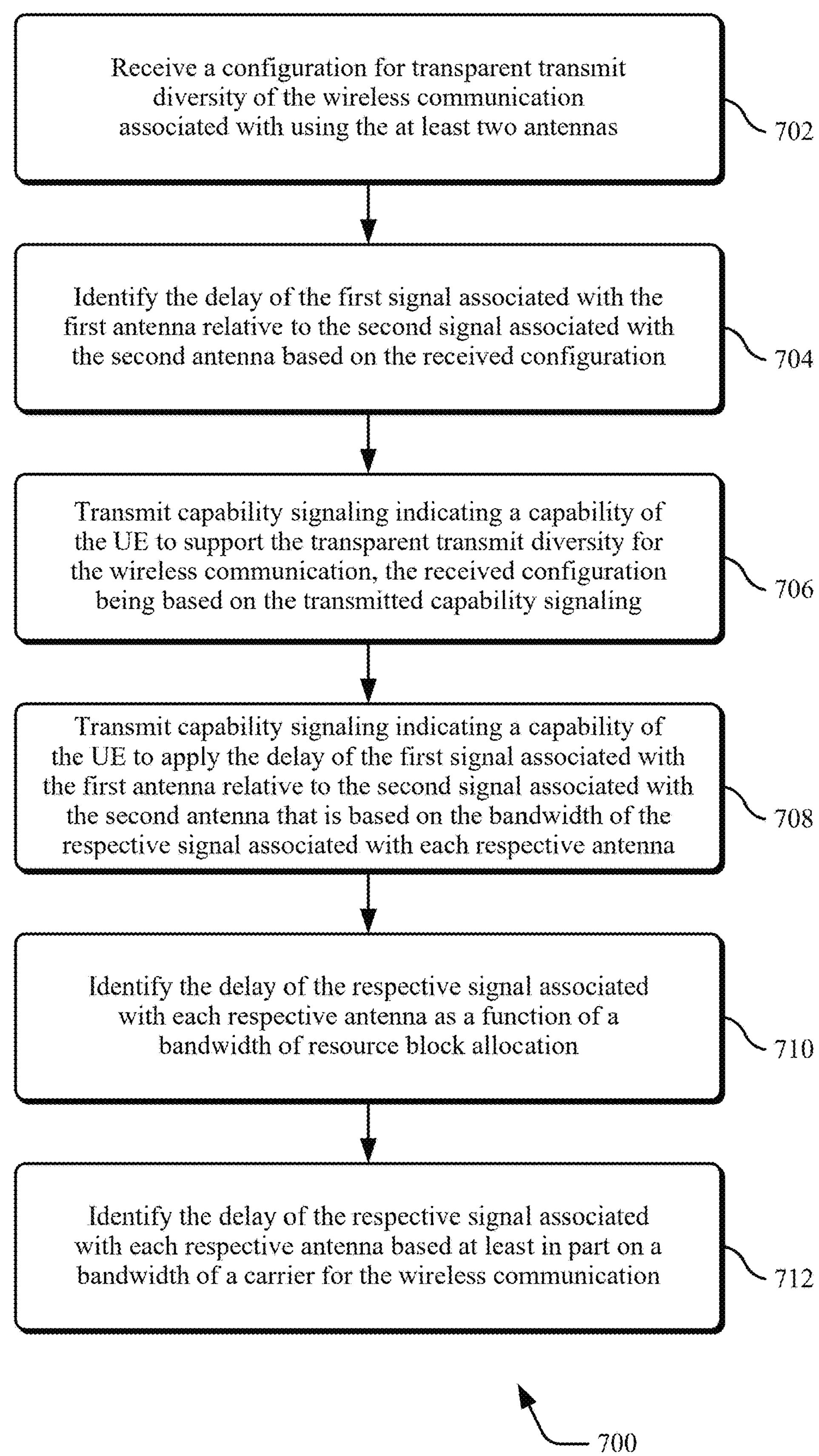

FIG. 7 illustrates a flowchart of a method 700 that supports transparent transmit diversity with bandwidth dependent delay in accordance with aspects of the present disclosure. The operations of the method 700 may be implemented and performed by a device or its components, such as a UE 104 as described with reference to FIGS. 1 through 5. In some implementations, the device may execute a set of instructions to control the function elements of the device to perform the described functions. Additionally, or alternatively, the device may perform aspects of the described functions using special-purpose hardware.

At 702, the method may include receiving a configuration for transparent transmit diversity of the wireless communication associated with using the at least two antennas. The operations of 702 may be performed in accordance with examples as described herein. In some implementations, aspects of the operations of 702 may be performed by a device as described with reference to FIG. 1.

At 704, the method may include identifying the delay of the first signal associated with the first antenna relative to the second signal associated with the second antenna based on the received configuration. The operations of 704 may be performed in accordance with examples as described herein. In some implementations, aspects of the operations of 704 may be performed by a device as described with reference to FIG. 1.

At 706, the method may include transmitting capability signaling indicating a capability of the UE to support the transparent transmit diversity for the wireless communication, the received configuration being based on the transmitted capability signaling. The operations of 706 may be performed in accordance with examples as described herein. In some implementations, aspects of the operations of 706 may be performed by a device as described with reference to FIG. 1.

At 708, the method may include transmitting capability signaling indicating a capability of the UE to apply the delay of the first signal associated with the first antenna relative to the second signal associated with the second antenna that is based on the bandwidth of the respective signal associated with each respective antenna. The operations of 708 may be performed in accordance with examples as described herein. In some implementations, aspects of the operations of 708 may be performed by a device as described with reference to FIG. 1.

At 710, the method may include identifying the delay of the respective signal associated with each respective antenna as a function of a bandwidth of resource block allocation. The operations of 710 may be performed in accordance with examples as described herein. In some implementations, aspects of the operations of 710 may be performed by a device as described with reference to FIG. 1.

At 712, the method may include identifying the delay of the respective signal associated with each respective antenna based at least in part on a bandwidth of a carrier for the wireless communication. The operations of 712 may be performed in accordance with examples as described herein. In some implementations, aspects of the operations of 712 may be performed by a device as described with reference to FIG. 1.

FIG. 8 illustrates a flowchart of a method 800 that supports transparent transmit diversity with bandwidth dependent delay in accordance with aspects of the present disclosure. The operations of the method 800 may be implemented and performed by a device or its components, such as a base station 102 (e.g., a gNB) as described with reference to FIGS. 1 through 5. In some implementations, the device may execute a set of instructions to control the function elements of the device to perform the described functions. Additionally, or alternatively, the device may perform aspects of the described functions using special-purpose hardware.

At 802, the method may include transmitting a resource allocation for wireless communication associated with a UE that uses at least two antennas, the wireless communication including a respective signal associated with each respective antenna of the two antennas of the UE, the resource allocation including a configuration for transparent transmit diversity of the wireless communication associated with using the two antennas, and the configuration including an indication of a cyclic delay usable by the UE. The operations of 802 may be performed in accordance with examples as described herein. In some implementations, aspects of the operations of 802 may be performed by a device as described with reference to FIG. 1.

At 804, the method may include receiving the respective signal associated with each respective antenna of the two antennas of the UE, where a delay of a first signal associated with a first antenna relative to a second signal associated with a second antenna is based on the resource allocation for the wireless communication. The operations of 804 may be performed in accordance with examples as described herein. In some implementations, aspects of the operations of 804 may be performed by a device as described with reference to FIG. 1.

Figure 9:
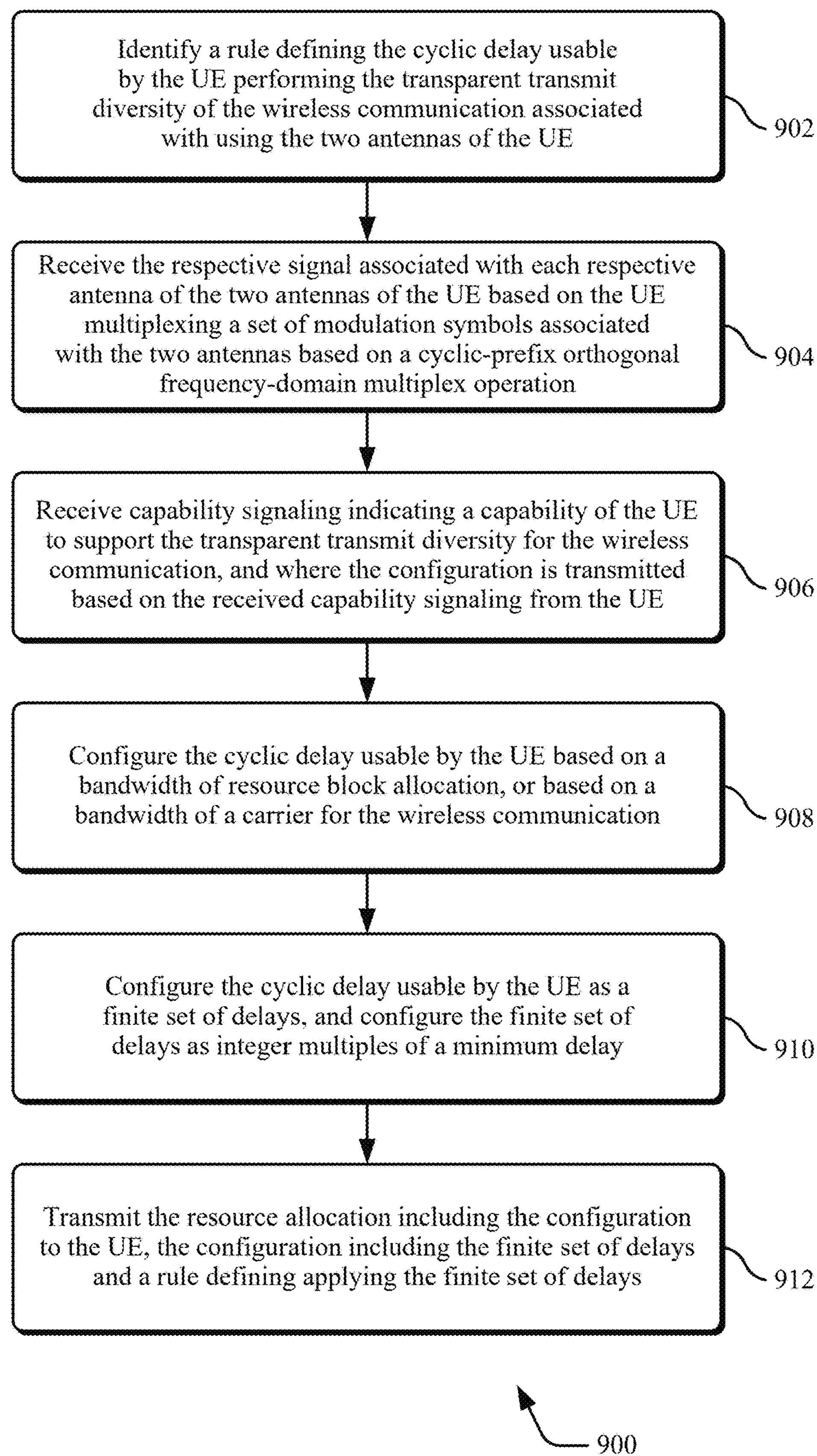

FIG. 9 illustrates a flowchart of a method 900 that supports transparent transmit diversity with bandwidth dependent delay in accordance with aspects of the present disclosure. The operations of the method 900 may be implemented and performed by a device or its components, such as a base station 102 (e.g., a gNB) as described with reference to FIGS. 1 through 5. In some implementations, the device may execute a set of instructions to control the function elements of the device to perform the described functions. Additionally, or alternatively, the device may perform aspects of the described functions using special-purpose hardware.

At 902, the method may include identifying a rule defining the cyclic delay usable by the UE performing the transparent transmit diversity of the wireless communication associated with using the two antennas of the UE. The operations of 902 may be performed in accordance with examples as described herein. In some implementations, aspects of the operations of 902 may be performed by a device as described with reference to FIG. 1.

At 904, the method may include receiving the respective signal associated with each respective antenna of the two antennas of the UE based on the UE multiplexing a set of modulation symbols associated with the two antennas based on a cyclic-prefix orthogonal frequency-domain multiplex operation. The operations of 904 may be performed in accordance with examples as described herein. In some implementations, aspects of the operations of 904 may be performed by a device as described with reference to FIG. 1.

At 906, the method may include receiving capability signaling indicating a capability of the UE to support the transparent transmit diversity for the wireless communication, and where the configuration is transmitted based on the received capability signaling from the UE. The operations of 906 may be performed in accordance with examples as described herein. In some implementations, aspects of the operations of 906 may be performed by a device as described with reference to FIG. 1.

At 908, the method may include configuring the cyclic delay usable by the UE based on a bandwidth of resource block allocation, or based on a bandwidth of a carrier for the wireless communication. The operations of 908 may be performed in accordance with examples as described herein. In some implementations, aspects of the operations of 908 may be performed by a device as described with reference to FIG. 1.

At 910, the method may include configuring the cyclic delay usable by the UE as a finite set of delays, and configuring the finite set of delays as integer multiples of a minimum delay. The operations of 910 may be performed in accordance with examples as described herein. In some implementations, aspects of the operations of 910 may be performed by a device as described with reference to FIG. 1.

At 912, the method may include transmitting the resource allocation including the configuration to the UE, the configuration including the finite set of delays and a rule defining applying the finite set of delays. The operations of 912 may be performed in accordance with examples as described herein. In some implementations, aspects of the operations of 912 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C, or AB or AC or BC, or ABC (i.e., A and B and C). Similarly, a list of one or more of A, B, or C means A or B or C, or AB or AC or BC, or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

receive a resource allocation for the wireless communication associated with using at least two antennas, the wireless communication comprising a respective signal associated with each respective antenna of the at least two antennas;

multiplex a set of modulation symbols associated with the at least two antennas based at least in part on a cyclic-prefix orthogonal frequency-domain multiplex operation;

transmit the respective signal associated with each respective antenna of the at least two antennas based at least in part on the multiplexing, wherein a delay of a first signal associated with a first antenna of the at least two antennas relative to a second signal associated with a second antenna of the at least two antennas is based at least in part on the resource allocation for the wireless communication; and identify the delay of the respective signal associated with each respective antenna based at least in part on a bandwidth of a carrier for the wireless communication.

2. The UE of claim 1, wherein the at least one processor is configured to cause the UE to receive a configuration for transparent transmit diversity of the wireless communication associated with using the at least two antennas.

3. The UE of claim 2, wherein the at least one processor is configured to cause the UE to identify the delay of the first signal associated with the first antenna of the at least two antennas relative to the second signal associated with the second antenna of the at least two antennas based at least in part on the received configuration.

4. The UE of claim 2, wherein the at least one processor is configured to cause the UE to transmit capability signaling indicating a capability of the UE to support the transparent transmit diversity for the wireless communication, and wherein the configuration is received based at least in part on the transmitted capability signaling.

5. The UE of claim 1, wherein:

the delay of the first signal associated with the first antenna relative to the second signal associated with the second antenna is based at least in part on a bandwidth of the respective signal associated with each respective antenna; and the bandwidth is based at least in part on a quantity of allocated resource blocks or subcarrier spacing.

6. The UE of claim 1, wherein the at least one processor is configured to cause the UE to identify the delay of the respective signal associated with each respective antenna as a function of a bandwidth of resource block allocation.

7. The UE of claim 1, wherein the delay of the first signal associated with the first antenna relative to the second signal associated with the second antenna is one of a cyclic delay or a linear delay.

8. A base station (BS) for wireless communication, comprising:

at least one memory; and at least one processor coupled with the at least one memory and configured to cause the BS to:

transmit a resource allocation for the wireless communication associated with a user equipment (UE) that uses at least two antennas, the wireless communication comprising a respective signal associated with each respective antenna of the at least two antennas of the UE, the resource allocation comprising a configuration for transparent transmit diversity of the wireless communication associated with using the at least two antennas, the configuration comprising an indication of a cyclic delay usable by the UE; and receive the respective signal associated with each respective antenna of the at least two antennas of the UE, wherein a delay of a first signal associated with a first antenna of the at least two antennas relative to a second signal associated with a second antenna of the at least two antennas is based at least in part on the resource allocation for the wireless communication, the delay of the respective signal associated with each respective antenna is based at least in part on a bandwidth of a carrier for the wireless communication.

9. The BS of claim 8, wherein the at least one processor is configured to cause the BS to identify a rule defining the cyclic delay usable by the UE performing the transparent transmit diversity of the wireless communication associated with using the at least two antennas of the UE.

10. The BS of claim 8, wherein the at least one processor is configured to cause the BS to receive the respective signal associated with each respective antenna of the at least two antennas of the UE based at least in part on the UE multiplexing a set of modulation symbols associated with the at least two antennas based at least in part on a cyclic-prefix orthogonal frequency-domain multiplex operation.

11. A method performed by a user equipment (UE), comprising:

receiving a resource allocation for wireless communication associated with using at least two antennas, the wireless communication comprising a respective signal associated with each respective antenna of the at least two antennas;

multiplexing a set of modulation symbols associated with the at least two antennas based at least in part on a cyclic-prefix orthogonal frequency-domain multiplex operation;

transmitting the respective signal associated with each respective antenna of the at least two antennas based at least in part on the multiplexing, wherein a delay of a first signal associated with a first antenna of the at least two antennas relative to a second signal associated with a second antenna of the at least two antennas is based at least in part on the resource allocation for the wireless communication; and identifying the delay of the respective signal associated with each respective antenna based at least in part on a bandwidth of a carrier for the wireless communication.

12. The method of claim 11, wherein:

the delay of the first signal associated with the first antenna relative to the second signal associated with the second antenna is based at least in part on a bandwidth of the respective signal associated with each respective antenna; and the bandwidth is based at least in part on a quantity of allocated resource blocks or subcarrier spacing.

13. The method of claim 11, further comprising identifying the delay of the respective signal associated with each respective antenna as a function of a bandwidth of resource block allocation.

14. A processor for wireless communication, comprising:

at least one controller coupled with at least one memory and configured to cause the processor to:

receive a resource allocation for the wireless communication associated with using at least two antennas, the wireless communication comprising a respective signal associated with each respective antenna of the at least two antennas;

multiplex a set of modulation symbols associated with the at least two antennas based at least in part on a cyclic-prefix orthogonal frequency-domain multiplex operation;

transmit the respective signal associated with each respective antenna of the at least two antennas based at least in part on the multiplexing, wherein a delay of a first signal associated with a first antenna of the at least two antennas relative to a second signal associated with a second antenna of the at least two antennas is based at least in part on the resource allocation for the wireless communication; and identify the delay of the respective signal associated with each respective antenna based at least in part on a bandwidth of a carrier for the wireless communication.

15. The processor of claim 14, wherein the at least one controller is configured to cause the processor to receive a configuration for transparent transmit diversity of the wireless communication associated with using the at least two antennas.

16. The processor of claim 15, wherein the at least one controller is configured to cause the processor to identify the delay of the first signal associated with the first antenna of the at least two antennas relative to the second signal associated with the second antenna of the at least two antennas based at least in part on the received configuration.

17. The processor of claim 15, wherein the at least one controller is configured to cause the processor to transmit capability signaling indicating a capability of a user equipment (UE) to support the transparent transmit diversity for the wireless communication, and wherein the configuration is received based at least in part on the transmitted capability signaling.

18. The processor of claim 14, wherein:

the delay of the first signal associated with the first antenna relative to the second signal associated with the second antenna is based at least in part on a bandwidth of the respective signal associated with each respective antenna; and the bandwidth is based at least in part on a quantity of allocated resource blocks or subcarrier spacing.

19. The processor of claim 14, wherein the at least one controller is configured to cause the processor to identify the delay of the respective signal associated with each respective antenna as a function of a bandwidth of resource block allocation.

20. The processor of claim 14, wherein the delay of the first signal associated with the first antenna relative to the second signal associated with the second antenna is one of a cyclic delay or a linear delay.

* * * * *